United States Patent [19]
Montgomery

[11] Patent Number: 5,415,518
[45] Date of Patent: May 16, 1995

[54] AUTOMATED METHOD AND SYSTEM FOR LOADING BOOK MAIL BUNDLES ONTO A PALLET

[75] Inventor: William T. Montgomery, Lancaster, Pa.

[73] Assignee: R.R. Donnelley & Sons Company, Lisle, Ill.

[21] Appl. No.: 111,848

[22] Filed: Aug. 25, 1993

[51] Int. Cl.⁶ .............................................. B65G 57/22
[52] U.S. Cl. ................................ 414/791.6; 414/793; 414/902
[58] Field of Search .................. 414/791.6, 792.9, 793, 414/789.5, 902; 198/502.2

[56] References Cited

U.S. PATENT DOCUMENTS

| | | | |
|---|---|---|---|
| Re. 33,416 | 10/1990 | Konishi et al. | 364/478 |
| 3,434,604 | 3/1969 | Haldimann et al. | |
| 3,902,609 | 9/1975 | Ohlsson | |
| 4,065,117 | 12/1977 | Thorsheim | |
| 4,352,616 | 10/1982 | Brenner | |
| 4,641,271 | 2/1987 | Konishi et al. | |
| 4,711,612 | 12/1987 | Kwauka | |
| 4,746,255 | 5/1988 | Roccabianca et al. | 414/902 |
| 4,820,104 | 4/1989 | Kwauka | |
| 4,927,318 | 5/1990 | Hayden et al. | |
| 5,042,235 | 8/1991 | Hannen et al. | |
| 5,139,388 | 8/1992 | Martin | 414/791.6 |
| 5,203,671 | 4/1993 | Cawley et al. | 414/791.6 |

Primary Examiner—Karen B. Merritt
Attorney, Agent, or Firm—Marshall, O'Toole, Gerstein, Murray & Borun

[57] ABSTRACT

In order to automate the palletizing of bundles of books in an efficient manner, an automated method and system is provided for achieving the objective of having mail bundle positions of substantially equal accumulative height. The method includes dividing the pallet into a grid consisting of a plurality of mail bundle positions adapted to receive one or more book mail bundles in rows and columns. The books are gathered into book mail bundles for placement on the grid of the pallet in accordance with a book gathering program. The books are gathered to form book mail bundles having a preselected minimum and maximum number of books with any grouping of books in numbers between the minimum and maximum number being divided into one or more book mail bundles of various sizes. The books are also gathered such that any grouping of books in numbers greater than the maximum number is divided into one or more book mail bundles having a number of books between the minimum and maximum. With this understanding, the method further includes placing the book mail bundles so formed onto the pallet in the mail bundle positions set forth in rows and columns such that each of the positions is of substantially equal accumulative height.

20 Claims, 5 Drawing Sheets

AUTOMATED METHOD AND SYSTEM FOR LOADING BOOK MAIL BUNDLES ONTO A PALLET

FIELD OF THE INVENTION

The present invention is generally related to binding lines and, more particularly, an automated method and system for loading book mail bundles onto a pallet.

BACKGROUND OF THE INVENTION

In recent years, there have been significant advances in binding line technology that have greatly enhanced their efficiency. It is now known, for instance, that nearly all aspects of operating a binding line can be highly automated in an advantageous manner to thereby lower costs and increase speed of production. Still additionally, binding lines are now known to offer a degree of flexibility that was heretofore unknown.

By way of example, the signatures can be selectively gathered to accomplish the objective of demographic editions. In other words, it is possible with modern technology to be able to create various editions of a book or magazine that differ one from the other so each is more specifically directed to the special interests of different groups of readers. Today, many publications are created in this manner, and the subscribers are therefore receiving a more satisfying product.

On another front, binding lines are now able to offer their customers the possibility of personalized books or magazines. This is accomplished by being able to print personalized messages, including the subscriber's name and other relevant information, on internal signatures as well as on the cover. Still further, the book or magazine may incorporate a sheet or card that contains a message of interest to the subscriber.

In addition to the foregoing, binding lines are now sufficiently sophisticated to achieve discounts in postage rates. This is accomplished by gathering books or magazines in a specific fashion, e.g., by carrier route, and then bundling the magazines according to town sort and/or carrier route which thereby qualifies the bundle for a postage savings. For this purpose, a book mail bundle which is accumulated by town sort and/or carrier route is typically shrink wrapped and then palletized.

In most cases, the shrink wrapped bundles are stacked on the pallet for shipment in such a manner that they have their backbones down. This is conventionally done by binding line personnel who receive the shrink wrapped bundles at the end of the line and place them onto the pallets. Obviously, if this last-mentioned process could be automated, it would further enhance the efficiencies in binding line operations.

The present invention is directed to overcoming one or more of the foregoing problems and achieving one or more of the resulting objects.

SUMMARY OF THE INVENTION

It is therefore a principal object of the present invention to provide a more automated binding line that further enhances the efficiencies thereof. It is a more specific object of the present invention to provide an automated method and system for loading book mail bundles onto a pallet. It is an additional object of the present invention to load book mail bundles onto a pallet so as to have substantially equal accumulative height.

Accordingly, the present invention is directed to an automated system for loading book mail bundles onto a pallet which includes means for conceptually dividing the pallet into a grid consisting of a plurality of mail bundle positions. The mail bundle positions are set forth in rows and columns with each of the mail bundle positions being adapted to receive one or more book mail bundles, and means are provided for gathering books into book mail bundles for placement on the grid of the pallet in accordance with a book gathering program. The book gathering program includes a preselected minimum and maximum number of books for forming a book mail bundle and further includes bundle forming control means for dividing any grouping of books in numbers between the minimum and maximum number into one or more book mail bundles of various sizes. The bundle forming control means also divides any grouping of books in numbers greater than the maximum number of books into book mail bundles such that they are divided and formed into one or more book mail bundles having a number of books between the minimum and maximum number of books. Additionally, the system includes means for placing the book mail bundles so formed onto the pallet in the mail bundle positions set forth in rows and columns such that each of the mail bundle positions is of substantially equal accumulative height.

In the preferred embodiment, the conceptual dividing means essentially comprises a theoretical division of the pallet which causes it to be divided into six rows and eight columns so that the grid has a total of forty-eight of the mail bundle positions. It has also been found advantageous for the preselected minimum number of books in the book gathering program to be six and the preselected maximum number of books in the book gathering program to be eighteen. The bundle forming control means preferably causes any grouping of books greater than the maximum to be divided into at least two separate mail bundles no greater than the maximum. It has further been found advantageous for the bundle placing means to place one or more bundles in each of the mail bundle positions to a height approximately that of a bundle having the maximum number of books. Still additionally, the preferred embodiment contemplates a plurality of positions for accumulating one or more bundles to approximately equal accumulative height by utilizing lift means for accumulating the bundles at each position.

In one embodiment, the system includes lift means for accumulating one or more bundles to approximately the total accumulative height in each of a plurality of positions upstream of the pallet and book placing means. The lift means advantageously includes at least one vacuum lift movable between a bundle pick up location at a point adjacent a bundle conveyor and each of the bundle accumulating positions which are each defined by a bundle receiving hopper. With this arrangement, the system also contemplates the utilization of means for pushing the accumulated bundles from the hoppers onto the conveyor after they have reached the total accumulative height therefor.

In another embodiment, the lift means includes a plurality of vacuum lifts which are positioned along and generally over a bundle conveyor for thereby temporarily retaining one of the bundles in a suspended position over the bundle conveyor. In this embodiment, a plurality of retractable stops are advantageously disposed along the conveyor such that one of the stops near each of the vacuum lifts defines each of the bundle accumulating positions. Still additionally, this embodiment preferably includes an extendable and retractable air cylinder upstream of the vacuum lifts for removing any of the bundles having less than the preselected minimum number of books from the bundle conveyor.

In either embodiment, the system preferably includes means for shrink wrapping each of the book mail bundles after the bundles have been formed by the bundle forming control means at a point upstream of the bundle accumulating lift means.

Still additional details of the most highly preferred embodiment include the grouping of books comprising the total number of books for a given townmark with the bundle forming control means causing any number less than the minimum number of six books to be a rejected bundle. It is also advantageous for the book placing means to comprise a robot operable between a downstream end of a bundle conveyor and the pallet with the book gathering program including bundle placement control means operatively associated with the robot for placing each of the book mail bundles at a predetermined position on the grid of the pallet in accordance with the book gathering program therefor. In this manner, the robot may thereby be directed to cause each of the mail bundle positions on the pallet to be of substantially equal accumulative height over the entirety of the pallet in the manner contemplated by the present invention.

In anther respect, the present invention is directed to a method for loading book mail bundles onto a pallet in automated fashion which comprises the step of dividing the pallet into a grid consisting of a plurality of mail bundle positions. The mail bundle positions are set forth in rows and columns with each of the mail bundle positions being adapted to receive one or more book mail bundles. The method further includes the step of gathering books into book mail bundles for placement on the grid of the pallet in accordance with a book gathering program. The books are gathered so as to form book mail bundles having a preselected minimum and maximum number of books and such that any grouping of books is divided in numbers between the minimum and maximum number into one or more book mail bundles of various sizes. The method still further includes the step of gathering the books such that any grouping of books in numbers greater than the maximum number of books is divided into book mail bundles. The books are gathered such that any grouping of books in numbers greater than the maximum number of books will be divided and formed into one or more book mail bundles having a number of books between the minimum and maximum number of books. Still additionally, the method includes the step of placing the book mail bundles so formed onto the pallet in the mail bundle positions set forth in rows and columns such that each of the mail bundle positions is of substantially equal accumulative height.

Other objects, advantages and features of the present invention will become apparent from a consideration of the following specification taken in conjunction with the accompanying drawings.

DETAILED DESCRIPTION OF THE PREFERRED EMBODIMENT

Figure 1:
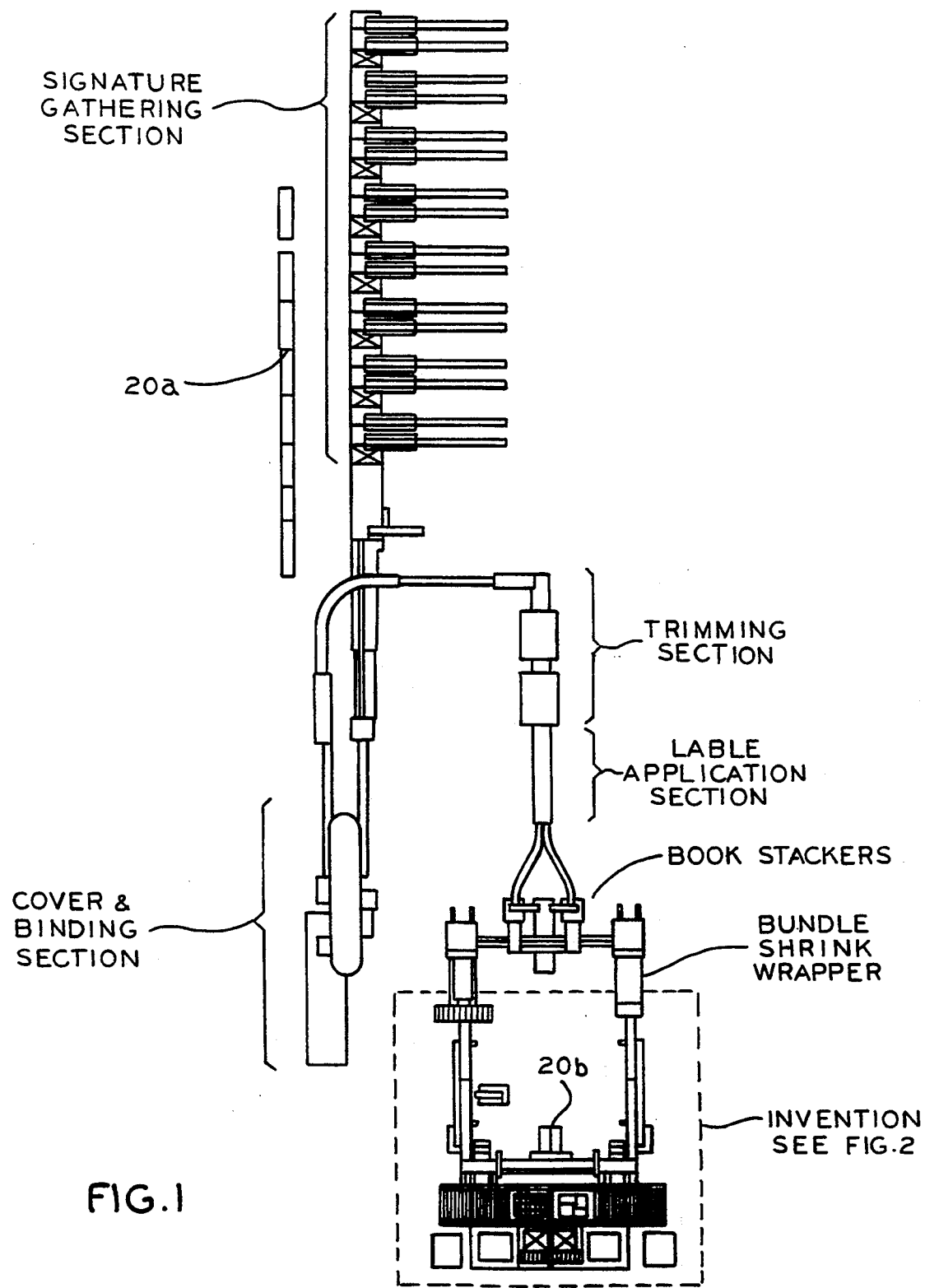
FIG. 1 is a schematic illustration of a binding line in accordance with the present invention.

In the illustrations given, and with reference first to FIG. 1, a typical binding line is shown with implementation of the present invention. It will be understood that the binding line is merely presented as typical of plant facilities in which the present invention may be utilized and, thus, it should not be construed as limiting the invention in any manner whatsoever. With this understanding, the binding line will be described in some detail in conjunction with the present invention in order to place the invention in its intended environment.

As shown, the binding line may typically produce one or two books and/or magazines per cycle of the machine. The binding line has a signature gathering section where signature packer boxes feed onto a gathering chain. In this manner, signatures from selected packer boxes are gathered for the purpose of forming a book or magazine.

After the signatures are gathered together, they are conveyed through the binding section where a cover is added and the book/magazine is bound together.

The book/magazine then passes to the trimming section where a large sized book is trimmed, or if the book size is small, two books can be trimmed apart.

The book/books then pass into the label application section where the address of the person receiving the book through the U.S. Postal Service is applied. The U.S. Postal Service regulations require that six (6) or more books with the same zip code must be bundled together for handling. By reading the address labels, the binding line makes up stacks of books ranging from six (6) books per stack, up to a maximum of eighteen (18) books per stack.

Figure 2:
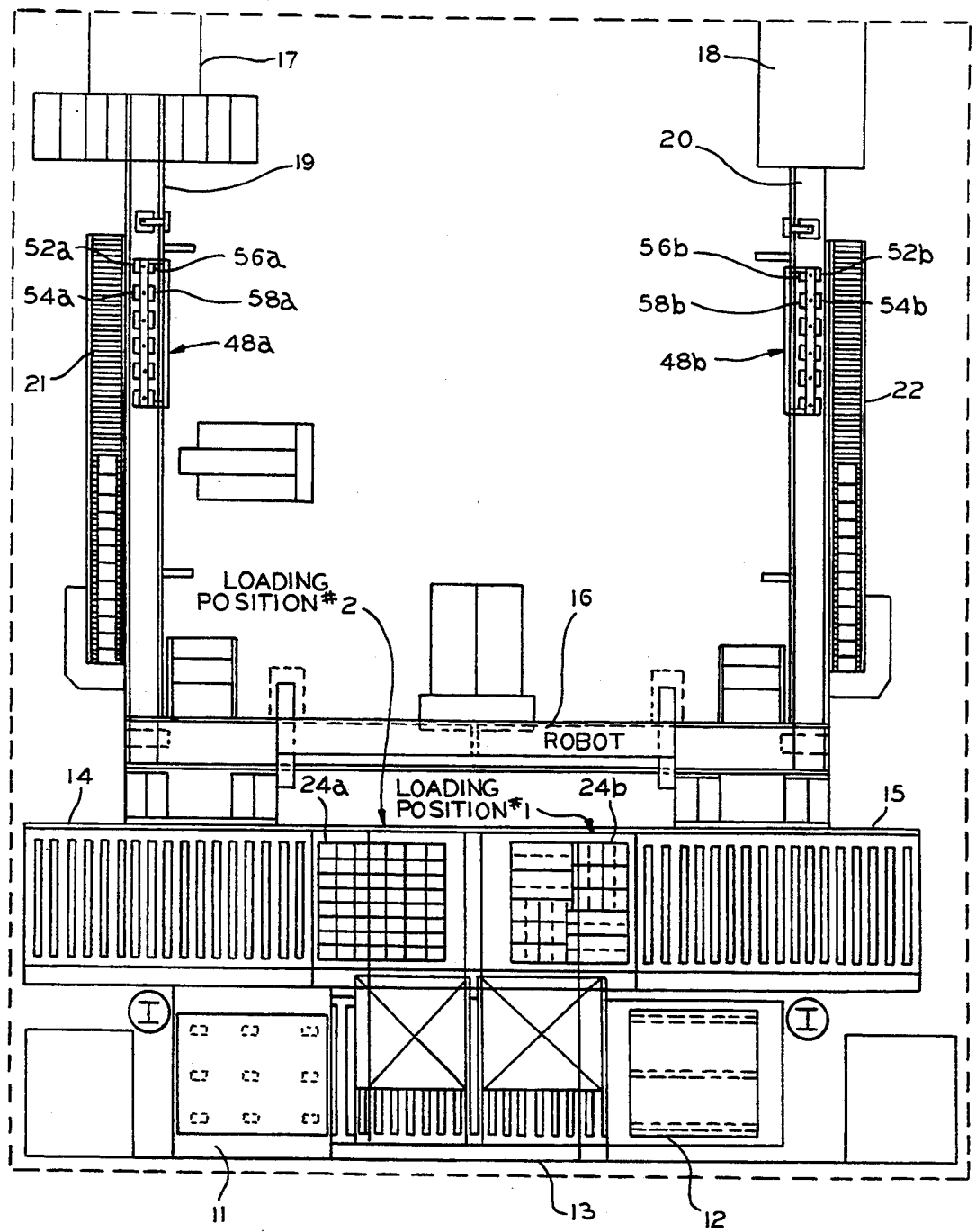
FIG. 2 is an enlarged view of the area of the binding line where the invention is utilized.
Figure 3:
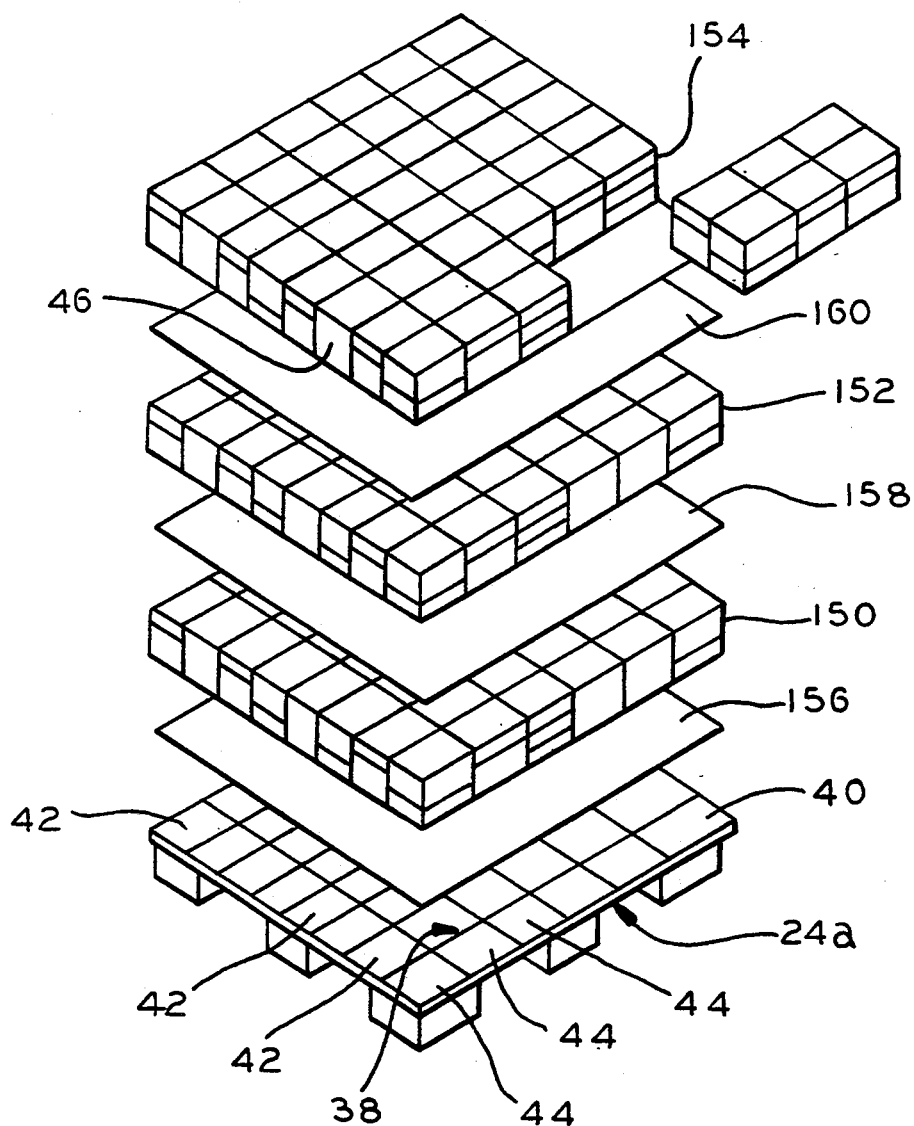
FIG. 3 is a perspective view of a pallet illustrating the manner of loading book mail bundles thereonto.

Next, the stacks are shrink-wrapped individually and loaded onto pallets for delivery to the U.S. Postal Service. With the invention, as shown in FIG. 2, it is possible to automatically load these stacks onto pallets in such a way as to make a stable pallet load for shipment to the U.S. Postal Service. Referring to FIG. 3, it will be seen how the pallet appears with the stacks of books automatically loaded onto the pallet.

Referring again to FIG. 2, a layout is shown for handling two streams of books coming from the binding line when it is producing two books per cycle of the line. The layout shows two pallet dispensers 11 and 12 for dispensing different type pallets to be loaded. These pallets are delivered to the loading positions 1 and 2 by pallet conveyor 13. When the pallets are full, they are conveyed to pick-up locations by conveyors 14 and 15.

In this connection, the equal height bundles are loaded onto the pallets when they are in their loading positions by a bundle loading robot 16. Mail bundles from the binding line exit from the shrink-wrap machines 17 and 18 at which point the bundles go onto the bundle stacking conveyors 19 and 20. On these conveyors, the bundles are made into equal height stacks for delivery to the bundle loading robot 16 or they are diverted onto conveyors 21 and 22 to be hand loaded when the mail pallet is finished and ready to be sent to the U.S. Postal Service.

With this background, and referring to FIGS. 1, 2 and 3, the present invention is specifically directed to an automated system for loading book mail bundles onto the pallets 24a and 24b. The system includes means for conceptually or theoretically dividing the pallets such as 24a into a grid 38 as shown schematically in FIG. 3, and the theoretical or conceptual grid 38 will be seen to consist of what may be referred to as a plurality of mail bundle positions such as 40 which are set forth in rows 42 and columns 44. As shown in FIG. 3, the mail bundle positions 40 are each adapted to receive one or more book mail bundles such as 46 to fill the grid 38 in a "columns and rows" fashion.

As shown in FIG. 2, the automated system includes means such as a stacker 48a, 48b, etc. for gathering books into book mail bundles such as 46 for placement on the grid 38 of the pallets 24a, 24b, etc. in accordance with the book gathering program. The book gathering program includes a preselected minimum and maximum number of books for forming a book mail bundle such as 46 and further includes bundle forming control means for dividing any grouping of books in numbers between the minimum and maximum number into one or more book mail bundles such as 46 of various sizes. In this connection, the bundle forming control means will also be understood to cause any particular grouping of books which is in numbers greater than the maximum number of books to be divided into book mail bundles such as 46.

More specifically, the bundle forming control means causes any grouping of books in numbers greater than the maximum number of books to be divided and formed into one or more book mail bundles such as 46 having a number of books between the minimum and maximum number of books.

Still referring to FIG. 2, the automated system further includes means such as the robot or robots 16 for placing the book mail bundles such as 46 so formed onto one of the respective pallets such as 24a, 24b, etc. in the mail bundle positions such as 40 set forth in rows and columns such as 42 and 44 such that each of the mail bundle positions is of substantially equal accumulative height.

In a preferred embodiment of the invention, the conceptual or theoretical dividing means may comprise conventional software of a type that is well within the ability of those skilled in the art for causing the pallets such as 24a, 24b, etc. to be thought of as being "divided" into six rows such as 42 and eight columns such as 44 so that the "grid" such as 38 has a total of 48 of the mail bundle positions such as 40. It is also preferred that the preselected minimum number of books in the book gathering program be six (6) and the preselected maximum number of books in the book gathering program be eighteen (18). The bundle forming control means advantageously causes any grouping of books greater than the maximum to be divided into at least two (2) separate mail bundles such as 46 neither one of which is greater than the maximum. It is also preferred that the bundle placing means or robot or robots 16 place one or more of the bundles such as 46 in each of the mail bundle positions such as 40 to a height approximately that of a bundle having the maximum number of books. Still additionally, and as will be described in greater detail hereinafter, the automated system preferably includes a plurality of positions such as 52a, 54a, etc. and 52b, 54b, etc. for accumulating one or more bundles such as 46 to approximately equal accumulative height together with lift means generally designated 56a, 58a, etc. and 56b, 58b, etc. for accumulating the bundles such as 46 at each of the respective positions.

As previously described, the automated system includes lift means such as 56a, 58a, etc. and 56b, 58b, etc. for accumulating one or more bundles such as 46 to approximately the total accumulative height in each of the plurality of positions 52a, 54a, etc. and 52b, 54b, etc. for the pallets such as 24a, 24b, etc. as well as the book placing means, i.e., robot or robots 16.

Figure 5:
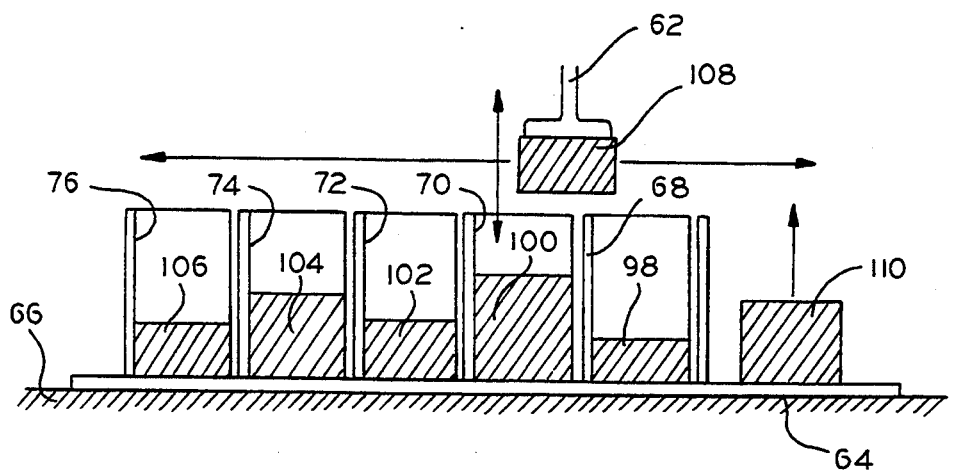
FIG. 5 is a side elevational view of an alternative device for accumulating book mail bundles to a desired height.
Figure 6:
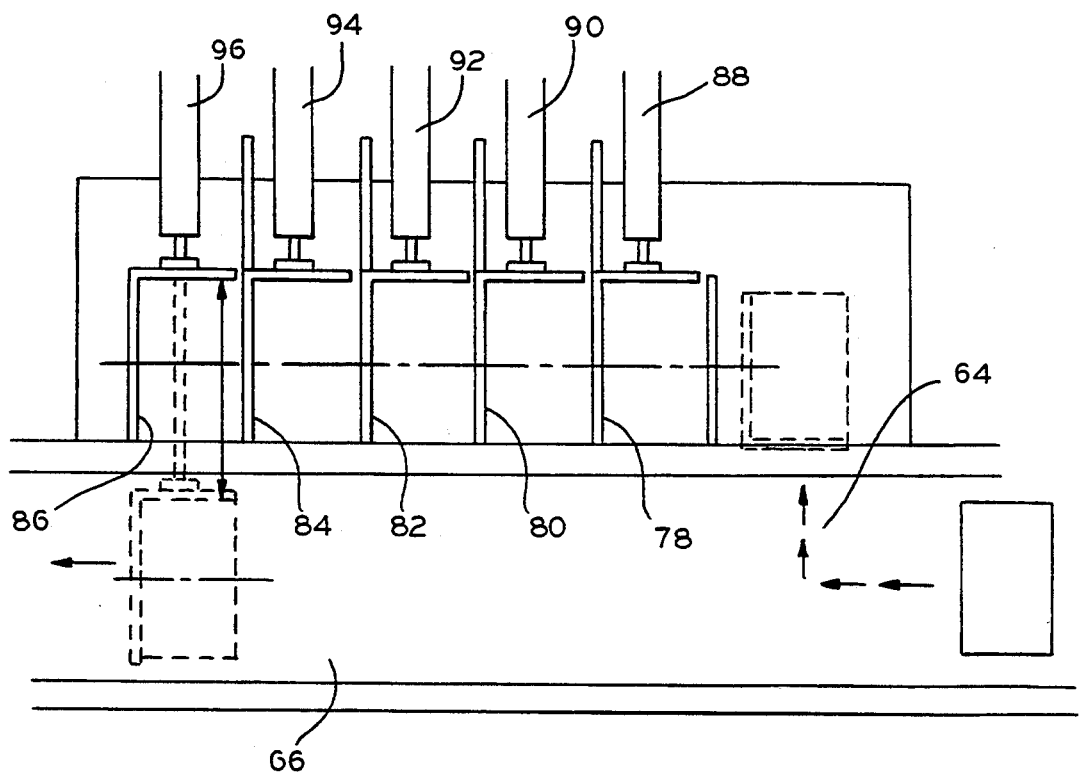
FIG. 6 is a top plan view of an alternative embodiment of a book mail bundle accumulating device.

In the embodiment illustrated in FIGS. 5 and 6, the lift means will be understood to include at least one vacuum lift 62 movable between a bundle pick-up location 64 at a point adjacent a bundle conveyor 66 and each of a plurality of bundle accumulating positions 68, 70, 72, 74 and 76. The bundle accumulating positions 68, 70, 72, 74 and 76 (which may correspond, e.g., to the positions 52a, 54a, etc. or 52b, 54b, etc.) are each preferably defined by a bundle receiving hopper 78, 80, 82, 84 and 86, respectively, and each include means such as an air cylinder 88, 90, 92, 94 and 96 for pushing the accumulated bundles such as 46 from the hoppers 78, 80, 82, 84 and 86 onto the bundle conveyor 66. Still additionally, the hoppers 78, 80, 82, 84 and 86 are located adjacent and along the bundle conveyor 66 and, as previously suggested, the air cylinders 88, 90, 92, 94 and 96 associated with each of the hoppers is extendable and retractable for pushing the accumulated bundles such as 46 as previously described.

Referring specifically to FIG. 5, it will be appreciated that the hoppers 78, 80, 82, 84 and 86 are shown as having each received a different sized bundle 98, 100, 102, 104 and 106 from the vacuum lift 62 which has been presorted and stacked upstream thereof. It will also be noted that the vacuum lift 62 is illustrated as carrying yet another bundle 108 which will be placed on a suitable one of the bundles such as 98, 100, 102, 104 and 106 in order to build a stack of bundles having a total accumulative height substantially the same as the height of the hoppers 78, 80, 82, 84 and 86 and the height of a single bundle such as 46 having the maximum number of books therein. Still further, as shown in FIG. 5, it will be noted that yet an additional bundle 110 is shown substantially at the bundle pick-up location 64 where it will be picked up by the vacuum lift 62 after it has placed the bundle 108 in an appropriate one of the hoppers 78, 80, 82, 84 and 86.

Figure 4:
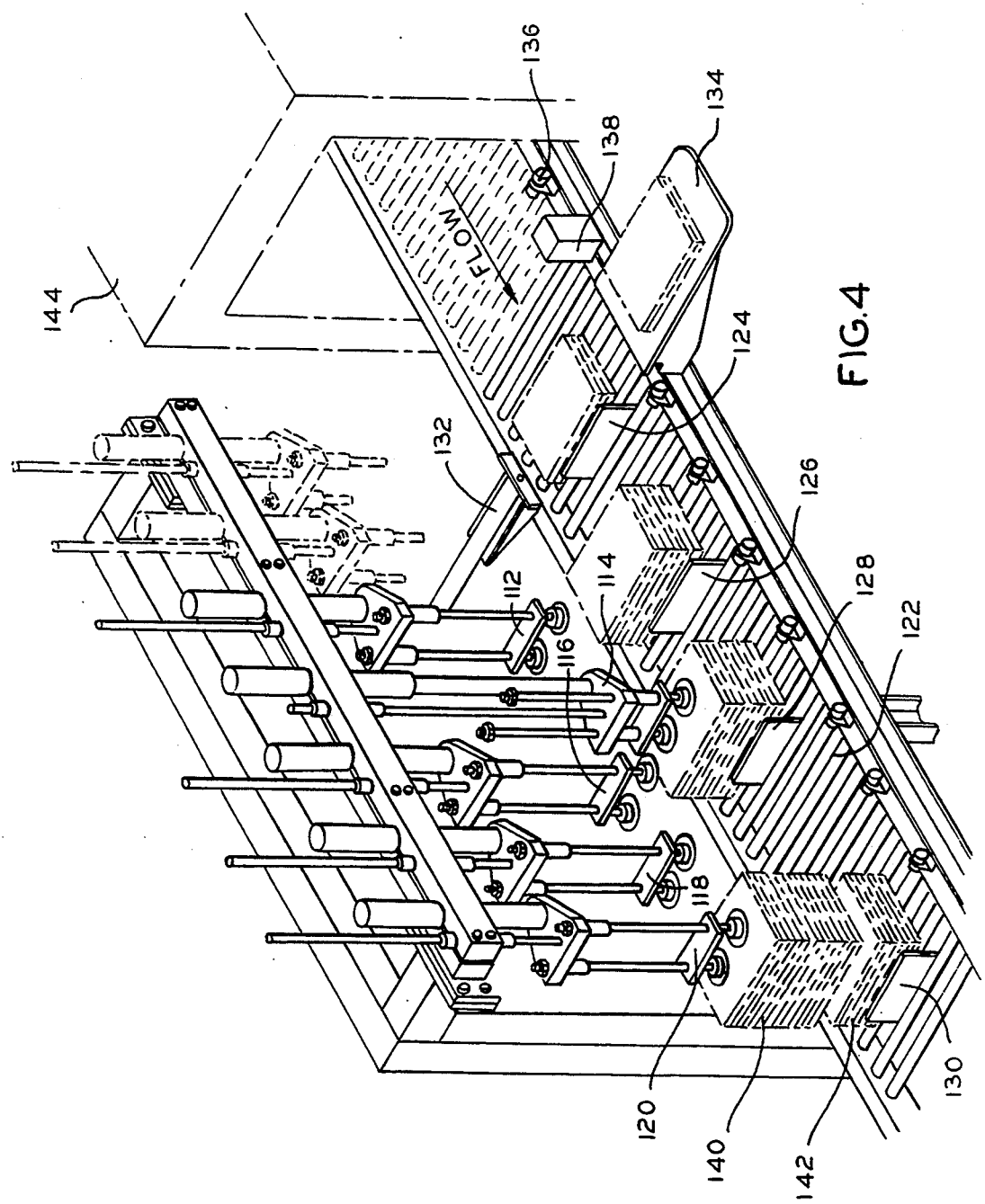
FIG. 4 is a perspective view of a device for accumulating book mail bundles, to a desired height.

Referring now to FIG. 4, another embodiment of the invention and, in particular, a different form of lift means is illustrated as comprising a plurality of vacuum lifts such as 112, 114, 116, 118 and 120 positioned along and generally over a bundle conveyor 122 for temporarily retaining one of the bundles such as 46 over the bundle conveyor 122. As shown, a plurality of retractable stops such as 124, 126, 128, 130, etc. are disposed along the conveyor 122 such that one of the stops near each of the vacuum lifts 112, 114, 116, 118 and 120 defines each of the bundle accumulating positions. As also shown, and utilizing the one of the stops designated 124, the automated system may include an extendable and retractable air cylinder 132 which is positioned upstream of the vacuum lifts 112, 114, 116, 118 and 120 for removing any of the bundles having less than the preselected minimum number of books from the bundle conveyor 122.

Still referring to FIG. 4, the air cylinder 132 may be utilized to remove the "below count" bundle by pushing it off of the bundle conveyor 122 onto a shelf 134 or onto a divert conveyor 21 or 22 (see FIG. 2). The exact manner of determining the "below count" status of a bundle may take various different forms such as the utilization of a product sensor 136 and/or a bar code reader 138; in the latter case, the bundle may have a bar code applied to it by suitable upstream equipment which is known by those skilled in the art and, by reason of computer control of an upstream stacker, the exact count of a particular bundle may be appropriately assigned to a given bar code. In any event, the details for accomplishing this function need not be set forth since they are known to those who are skilled in this art.

As shown in FIG. 4, the vacuum lifts 112, 114, 116, 118 and 120 may be utilized to temporarily grip and lift a given bundle such as 140 following which the bundle conveyor 122 may continue to convey other bundles such as 142 which may subsequently be stopped by means of the associated retractable stop such as 130. This will permit placement of the bundle 140 onto the bundle 142 to create an accumulated stack of bundles of an appropriate height. As will be appreciated, the control of the vacuum lifts 112, 114, 116, 118 and 120 as well as the retractable stops 124, 126, 128, 130, etc. may be accomplished in a known manner by the utilization of appropriate computer control equipment which will be associated with the binding lines.

As mentioned in connection with the embodiment of FIGS. 2 and 4, the vacuum lifts 112, 114, 116, 118 and 120 may comprise the lift means 56a, 58a, etc. or the lift means 56b, 58b, etc. It will also be appreciated that the retractable stops such as 124, 126, 128, 130, etc. may define the bundle accumulating positions such as 52a, 54a, etc. or 52b, 54b, etc. Moreover, the bundle conveyor 122 (or the bundle conveyor 66 in FIGS. 5 and 6) may comprise the bundle conveyor 19 and 20 of the respective binding lines.

In either of the embodiments illustrated in FIG. 4 or FIGS. 5 and 6, the automated system advantageously includes means such as the shrink wrap tunnel 144 for shrink wrapping each of the book mail bundles which have been generated by the book stackers. These bundles then proceed to the invention, to be stacked into two equal height stacks of two (2) or (3) bundles which then proceed to the robot or robots 16. As for the bundle forming control means, and all of the other computerized equipment mentioned in this description, it will be appreciated that suitable software known in the art can be provided in association with appropriate hardware at the respective electrical/computer panel stations 20a, 20b, etc. (see FIG. 1).

In accordance with a most preferred aspect of the invention, the bundle forming control means divides any grouping of books into bundles of six (6), seven (7), eight (8), nine (9), ten (10), eleven (11), twelve (12), or eighteen (18). As an example, a zip code having thirteen (13) books in it would be divided into a bundle of six (6) and a bundle of seven (7). The bundle of six (6) would later be combined with a bundle of twelve (12) to make the maximum bundle of eighteen (18). If a zip code had forty eight (48) books in it, it would be divided into a bundle of eighteen (18), another bundle of eighteen (18), and a bundle of twelve (12). The two bundles of eighteen (18) would go directly to the robot 16, but the bundle of twelve (12) would be stopped at the invention and combined with a stack of six (6) to make a bundle of eighteen (18) before proceeding to the robot 16.

Still additionally, the grouping of books is advantageously the total number of books for a given townmark and, further, the bundle forming control means causes any number less than the minimum number of six (6) books to be a rejected bundle. It should also be noted that the book placing means or robot 16 is operable between a downstream end of a bundle conveyor such as 66 or 122 and a pallet such as 24a, 24b, etc. and, as previously suggested, the book gathering program includes bundle placement control means operatively associated with the robot 16 for placing each of the book mail bundles at a predetermined position on the grid 38 of the pallet such as 24a, 24b, etc. in accordance with the book gathering program. In this manner, the robot such as 24a, 24b, etc. causes each of the mail bundle positions such as 40 to be occupied by one or more book mail bundles having a total accumulative height approximately equal to that of a book mail bundle having the maximum number of books.

Referring to FIG. 3, this is clearly illustrated, and it will be noted that each of the layers of accumulated book mail bundles such as 150, 152 and 154 includes one or more book mail bundles. In some cases, there are as many as three (3) book mail bundles at each of the positions such as 40 on the grid. In this manner, the layers of book mail bundles such as 150, 152 and 154 may all be of substantially equal accumulative height over the entirety of the pallet such as 24a in accordance with the invention.

As will also be noted, and as is conventional, there will be provided a bottom cardboard such as 156, intermediate cardboard slip sheets such as 158 and 160, and finally (not shown in FIG. 3) a skid top such as that indicated in FIG. 2.

In one actual specific example, books were sorted in accordance with townmarks, as follows:

| SORTATION OF TOWNMARKS | |
|---|---|
| No. Of Copies/Townmark | Bundle Forming Program |
| 1–5 | Reject Bundle |
| 6 | Bundle of 6 |
| 7 | Bundle of 7 |
| 8 | Bundle of 8 |
| 9 | Bundle of 9 |
| 10 | Bundle of 10 |
| 11 | Bundle of 11 |
| 12 | Bundle of 12 |
| 13 | Bundle of 6 + Bundle of 7 |
| 14 | Bundle of 6 + Bundle of 8 |
| 15 | Bundle of 6 + Bundle of 9 |
| 16 | Bundle of 6 + Bundle of 10 |
| 17 | Bundle of 6 + Bundle of 11 |
| 18 | Bundle of 18 |
| 19 | Bundle of 12 + Bundle of 7 |
| 20 | Bundle of 12 + Bundle of 8 |
| 21 | Bundle of 12 + Bundle of 9 |
| 22 | Bundle of 12 + Bundle of 10 |
| 23 | Bundle of 12 + Bundle of 11 |
| 24 | Bundle of 18 + Bundle of 6 |
| 25 | Bundle of 18 + Bundle of 7 |
| 26 | Bundle of 18 + Bundle of 8 |
| 27 | Bundle of 18 + Bundle of 9 |
| 28 | Bundle of 18 + Bundle of 10 |
| 29 | Bundle of 18 + Bundle of 11 |
| 30 | Bundle of 18 + Bundle of 12 |

-continued

| SORTATION OF TOWNMARKS | |
|---|---|
| No. Of Copies/Townmark | Bundle Forming Program |
| 31 | Bundle of 18 + Bundle of 6 + Bundle of 7 |

In order to understand the implementation of the invention, there is presented below a chart representing a manner of achieving a pallet arrangement. The first column represents the total number of copies in a given townmark, the second column represents the breakdown, i.e., the total number of mail bundles as well as the number of books in each bundle, for the total number of copies in a given townmark, and the remaining columns represent the placement of those book mail bundles in rows of the pallet to achieve the objective of having substantially equal accumulative height. As will be appreciated, the pallet arrangement can be established manually in chart form or, preferably, by the utilization of conventional software that can perform these same tasks.

For purposes of understanding the manner of achieving a suitable pallet arrangement, the following chart form is useful:

| | | PALLET ARRANGEMENT | | | | | | | |
|---|---|---|---|---|---|---|---|---|---|
| Copies In Townmark | Breakdown | Pos 1 | Pos 2 | Pos 3 | Pos 4 | Pos 5 | Pos 6 | Pos 7 | Pos 8 |
| END OF PALLET #1 | _ BUNDLES - REJECTED _ BUNDLES | | | | | _ TOTAL BOOKS | | | |

In another respect, the present invention is directed to a method for loading book mail bundles onto a pallet in automated fashion including the step of dividing the pallet into a grid consisting of a plurality of mail bundle positions. The mail bundle positions are set forth so as to be in rows and columns with each of the mail bundle positions being adapted to receive one or more book mail bundles which are formed in accordance with the invention. The method also includes the step of gathering books into book mail bundles which are then suitable for placement on the grid of the pallet in accordance with a book gathering program. The books are gathered so as to form book mail bundles having a preselected minimum and maximum number of books and, furthermore, any particular grouping of books in numbers between the minimum and maximum number of books is divided into one or more book mail bundles of various sizes. The method also includes the step of gathering books such that any grouping of books in numbers greater than the maximum is divided into book mail bundles. The books are gathered such that any grouping in numbers greater than the maximum is divided and formed into one or more book mail bundles having a number of books between the minimum and maximum. With this understanding, the method further includes the step of placing the book mail bundles so formed onto the pallet in the mail bundle positions set forth in rows and columns such that each of the mail bundle positions is of substantially equal accumulative height.

Still additionally, the method contemplates the books being gathered such that any grouping of books greater than the maximum number of books for forming a book mail bundle is divided into at least two separate mail bundles equal to or less than the maximum number of books.

Still other details of the method will be apparent from the detailed description of the automated system hereinabove.

While in the foregoing there have been set forth preferred embodiments of the invention, it will be appreciated that the details herein given may be varied by those skilled in the art without departing from the true spirit and scope of the appended claims.

I claim:

1. An automated system for loading book mail bundles onto a pallet, comprising:

means for conceptually dividing the pallet into a grid consisting of a plurality of mail bundle positions set forth in rows and columns with each of said mail bundle positions being adapted to receive one or more book mail bundles;

means for gathering books into book mail bundles for placement on said grid of said pallet in accordance with a book gathering program, said book gathering program including a preselected minimum and maximum number of books for forming a book mail bundle and further including bundle forming control means for dividing any grouping of books in numbers between said minimum and maximum number into one or more book mail bundles of various sizes, said bundle forming control means also dividing and forming any grouping of books in numbers greater than said maximum number of books;

into one or more book mail bundles having a number of books between said minimum and maximum number of books;

means for placing said book mail bundles so formed onto said pallet in said mail bundle positions set forth in rows and columns such that each of said mail bundle positions has book mail bundles of substantially equal accumulative height; and a plurality of positions for accumulating one or more bundles to approximately said accumulative height and lift means for accumulating said bundles at each of said positions.

2. The automated system of claim 1 wherein said conceptual dividing means causes said pallet to be divided into six rows and eight columns so that said grid has a total of forty eight of said mail bundle positions.

3. The automated system of claim 1 wherein said preselected minimum number of books in said book gathering program is six and said preselected maximum number of books in said book gathering program is eighteen.

4. The automated system of claim 1 wherein said bundle forming control means causes any grouping of books greater than said maximum number of books to be divided into at least two separate mail bundles no greater than said maximum number of books.

5. The automated system of claim 1 wherein said bundle placing means places one or more bundles in each of said mail bundle positions to a height approximately that of a bundle having said maximum number of books.

6. An automated system for loading book mail bundles onto a pallet, comprising:
means for conceptually dividing the pallet into a grid consisting of a plurality of mail bundle positions set forth in rows and columns with each of said mail bundle positions being adapted to receive one or more book mail bundles;
means for gathering books into book mail bundles for placement on said grid of said pallet in accordance with a book gathering program, said book gathering program including a preselected minimum and maximum number of books for forming a book mail bundle and further including bundle forming control means for dividing any grouping of books in numbers between said minimum and maximum number into one or more book mail bundles of various sizes, said bundle forming control means also dividing and forming any grouping of books in numbers greater than said maximum number of books;
into one or more book mail bundles having a number of books between said minimum and maximum number of books, said bundle forming control means causing any grouping of books greater than said maximum number of books for forming a book mail bundle to be formed into at least two separate mail bundles equal to or less than said maximum number of books;
means for placing said book mail bundles so formed onto said pallet in said mail bundle positions set forth in rows and columns such that each of said mail bundle positions is occupied by one or more book mail bundles having a total accumulative height approximately equal to that of a book mail bundle having said maximum number of books; and
lift means for accumulating one or more bundles to approximately said total accumulative height in each of a plurality of positions upstream of said pallet and book placing means.

7. The automated system of claim 6 wherein said conceptual dividing means causes said pallet to be divided into six rows and eight columns so that said grid has a total of forty eight of said mail bundle positions.

8. The automated system of claim 6 wherein said preselected minimum number of books in said book gathering program is six and said preselected maximum number of books in said book gathering program is eighteen.

9. The automated system of claim 6 wherein said lift means includes at least one vacuum lift movable between a bundle pick-up location at a point adjacent a bundle conveyor and each of said bundle accumulating positions.

10. The automated system of claim 9 wherein said bundle accumulating positions are each defined by a bundle receiving hopper and including means for pushing said accumulated bundles from said hoppers onto said bundle conveyor.

11. The automated system of claim 10 wherein said hoppers are located adjacent and along said bundle conveyor and wherein said pushing means includes an extendable and retractable air cylinder associated with each of said hoppers.

12. The automated system of claim 9 wherein said lift means includes a plurality of vacuum lifts positioned along and over a bundle conveyor for temporarily retaining one of said bundles over said bundle conveyor.

13. The automated system of claim 12 including a plurality of retractable stops disposed along said conveyor such that one of said stops near each of said vacuum lifts defines each of said bundle accumulating positions.

14. The automated system of claim 13 including an extendable and retractable air cylinder upstream of said vacuum lifts for removing any of said bundles having less than said preselected minimum number of books from said bundle conveyor.

15. The automated system of claim 6 including means for shrink wrapping each of said book mail bundles after said bundle has been formed by said bundle forming control means at a point upstream of said bundle accumulating lift means.

16. An automated system for loading book mail bundles onto a pallet, comprising:
means for conceptually dividing the pallet into a grid consisting of a total of forty eight mail bundle positions set forth in six rows and eight columns with each of said mail bundle positions being adapted to receive one or more book mail bundles;
means for gathering books into book mail bundles for placement on said grid of said pallet in accordance with a book gathering program, said book gathering program including a preselected minimum number of six books and a preselected maximum number of eighteen books for forming book mail bundles and further including bundle forming control means for dividing or maintaining any grouping of books in numbers between said minimum number of six books and said maximum number of eighteen books into a book mail bundle of six, seven, eight, nine, ten, eleven, twelve, or eighteen books, said bundle forming control means also dividing and forming any grouping of books in numbers greater than said maximum number of eighteen books;
into a book mail bundle of six, seven, eight, nine, ten, eleven, twelve, or eighteen books;
means for placing said book mail bundles so formed onto said pallet in said mail bundle positions set forth in said six rows and eight columns such that each of said mail bundle positions has book mail bundles of substantially equal accumulative height: and
lift means for accumulating one or more bundles to approximately said total accumulative height in each of a plurality of positions upstream of said pallet and book placing means, said lift means including at least one vacuum lift movable between a bundle pick-up location at a point adjacent a bundle conveyor and each of said bundle accumulating positions, said bundle accumulating positions each being defined by a bundle receiving hopper and including means for pushing said accumulated bundles from said hoppers onto said bundle conveyor, said hoppers being located adjacent and along said bundle conveyor and said pushing means including an extendable and retractable air cylinder associated with each of said hoppers.

17. The automated system of claim 16 wherein said grouping of books is the total number of books for a given townmark and said bundle forming control means causes any number less than said minimum number of six books to be a rejected bundle.

18. The automated system of claim 16 including means for shrink wrapping each of said book mail bundles after said bundle has been formed by said bundle forming control means at a point upstream of said bundle accumulating lift means.

19. The automated system of claim 16 wherein said book placing means includes a robot operable between a downstream end of said bundle conveyor and said pallet, said book gathering program including bundle placement control means operatively associated with said robot for placing each of said book mail bundles at a predetermined position on said grid of said pallet in accordance with said book gathering program, said robot thereby causing each of said mail bundle positions to have book mail bundles of substantially equal accumulative height over the entirety of said pallet.

20. An automated system for loading book mail bundles onto a pallet, comprising:

means for conceptually dividing the pallet into a grid consisting of a total of forty eight mail bundle positions set forth in six rows and eight columns with each of said mail bundle positions being adapted to receive one or more book mail bundles;

means for gathering books into book mail bundles for placement on said grid of said pallet in accordance with a book gathering program, said book gathering program including a preselected minimum number of six books and a preselected maximum number of eighteen books for forming book mail bundles and further including bundle forming control means for dividing or maintaining any grouping of books in numbers between said minimum number of six books and said maximum number of eighteen books into a book mail bundle of six, seven, eight, nine, ten, eleven, twelve, or eighteen books, said bundle forming control means also dividing and forming any grouping of books in numbers greater than said maximum number of eighteen books;

into a book mail bundle of six, seven, eight, nine, ten, eleven, twelve, or eighteen books;

means for placing said book mail bundles so formed onto said pallet in said mail bundle positions set forth in said six rows and eight columns such that each of said mail bundle positions has book mail bundles of substantially equal accumulative height; and lift means for accumulating one or more bundles to approximately said total accumulative height in each of a plurality of positions upstream of said pallet and book placing means, said lift means including a plurality of vacuum lifts positioned along and over a bundle conveyor for temporarily retaining one of said bundles over said bundle conveyor, and including a plurality of retractable stops disposed along said conveyor such that one of said stops near each of said vacuum lifts defines each of said bundle accumulating positions, and an extendable and retractable air cylinder upstream of said vacuum lifts for removing any of said bundles having less than said preselected minimum number of books from said bundle conveyor.

* * * * *